(12) United States Patent
Dotan

(10) Patent No.: US 9,507,947 B1
(45) Date of Patent: Nov. 29, 2016

(54) SIMILARITY-BASED DATA LOSS PREVENTION

(71) Applicant: EMC Corporation, Hopkinton, MA (US)

(72) Inventor: Yedidya Dotan, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 98 days.

(21) Appl. No.: 14/040,382

(22) Filed: Sep. 27, 2013

(51) Int. Cl.
G06F 21/00 (2013.01)
G06F 21/60 (2013.01)

(52) U.S. Cl.
CPC .................................... G06F 21/60 (2013.01)

(58) Field of Classification Search
CPC ........ G06F 21/60; G06F 21/00; G06F 21/10; G06F 21/121; G06F 21/125; G06F 21/128; G11B 20/00086; H04N 21/44236
USPC .......................................................... 726/26
See application file for complete search history.

(56) References Cited

U.S. PATENT DOCUMENTS

| | | | |
|---|---|---|---|
| 8,452,965 B1 | 5/2013 | Griffin et al. | |
| 8,601,553 B1 | 12/2013 | Griffin et al. | |
| 8,621,237 B1 | 12/2013 | Bailey et al. | |
| 8,655,787 B1 | 2/2014 | Griffin et al. | |
| 8,656,455 B1 | 2/2014 | Bailey et al. | |
| 8,683,592 B1 | 3/2014 | Dotan et al. | |
| 8,694,781 B1 | 4/2014 | Griffin et al. | |
| 8,706,486 B1 * | 4/2014 | Devarajan et al. | 704/235 |
| 8,726,405 B1 | 5/2014 | Bailey et al. | |
| 8,739,257 B1 | 5/2014 | Robinson | |
| 8,817,988 B1 | 8/2014 | Stockton et al. | |
| 8,825,848 B1 | 9/2014 | Dotan et al. | |
| 9,013,732 B1 | 4/2015 | Madhukar | |
| 2002/0073313 A1 * | 6/2002 | Brown et al. | 713/165 |
| 2007/0183000 A1 * | 8/2007 | Eisen et al. | 358/452 |
| 2008/0092242 A1 * | 4/2008 | Rowley | 726/27 |
| 2010/0250547 A1 * | 9/2010 | Grefenstette et al. | 707/740 |
| 2011/0093768 A1 * | 4/2011 | Panwar | 714/809 |

\* cited by examiner

Primary Examiner — William Goodchild
(74) Attorney, Agent, or Firm — BainwoodHuang

(57) ABSTRACT

A technique performs similarity-based data loss prevention on content from a content source. The technique involves generating multiple variants from the content, the multiple variants including a set of variants for each parsed word of the content, each variant of that set (i) including multiple characters and (ii) differing from other variants of that set by at least one character. The technique further involves performing evaluation operations to determine whether any of the variants includes sensitive data. The technique further involves performing, in response to the evaluation operations, a control operation which (i) releases all of the parsed words of the content to a destination when none of the variants is determined to include sensitive data, and (ii) blocks at least one parsed word of the content from reaching the destination when at least one variant is determined to include sensitive data.

24 Claims, 5 Drawing Sheets

SIMILARITY-BASED DATA LOSS PREVENTION

BACKGROUND

Data loss prevention (DLP) refers to a technology which prevents unauthorized disclosure of sensitive information. Examples of sensitive information that can be protected by DLP include names, addresses, telephone numbers, social security numbers, credit card numbers, bank account numbers, and medical records.

One convention DLP system starts by extracting text from a document. The conventional DLP system may apply optical character recognition (OCR) to improve the accuracy of converting characters (i.e., letters, digits, symbols, etc.) in the document correctly into plain text. Next, the conventional DLP system parses the extracted text into words by narrowing the extracted text to a particular vocabulary (e.g., English, Russian, Hebrew, etc.). Finally, the conventional DLP system performs exact and fuzzy matching to match the words to restricted words and/or restricted patterns. If there is a match between a particular word and the restricted words or restricted patterns, the particular word or the entire document is prevented from being disclosed thus safeguarding the sensitive information.

SUMMARY

Unfortunately, there are deficiencies to the above-described conventional DLP system. In particular, when the conventional DLP system extracts text and parses the extracted text into words, the conventional DLP strives for accuracy. For example, the conventional DLP system may to distinguish between a lower case "L" and the number one (1) or between an upper case "O" and the number zero (0) so as to properly detect a sensitive social security number or a sensitive credit card number.

However, such operation is counter to a malicious person attempting to undermine the conventional DLP system. Along these lines, a malicious person attempting to circumvent DLP may purposefully replace certain characters of sensitive information with other characters to camouflage (i.e., hide) the sensitive information just enough so that the sensitive information passes through DLP but so that the words still have useful meaning. As a result, the malicious person is able to successfully subvert the conventional DLP system by introducing noise (e.g., adding purposeful typos, replacing particular characters or numbers with symbols, changing fonts, and so on).

In contrast to the above-described conventional DLP system which strives for accuracy and is thus easy to circumvent, improved techniques are directed to performing DLP by generating multiple variants (i.e., similar permutations) from content (e.g., where several variants are generated for a single parsed word) and only releasing the content when there are no variants that register as sensitive data. If there is at least one variant that registers as sensitive data, the content may include actual sensitive data or a malicious person may have slightly modified the sensitive data in an attempt to defeat DLP. In some arrangements, the variants for each parsed word are assigned numerical risk scores and that parsed word is considered to include sensitive data when any of the numerical risk scores exceeds a predefined threshold score. Such similarity-based DLP enables convenient tuning and machine learning for a DLP system.

One embodiment is directed to a method of performing data loss prevention on content from a content source. The method includes generating, by processing circuitry, multiple variants from the content, the multiple variants including a set of variants for each parsed word of the content, each variant of that set (i) including multiple characters and (ii) differing from other variants of that set by at least one character (i.e., where at least one character has been changed). The method further includes performing, by the processing circuitry, evaluation operations to determine whether any of the variants includes sensitive data. The method further includes performing, in response to the evaluation operations and by the processing circuitry, a control operation which (i) releases all of the parsed words of the content to a destination when none of the variants is determined to include sensitive data, and (ii) blocks at least one parsed word of the content from reaching the destination when at least one variant is determined to include sensitive data.

In some arrangements, generating the multiple variants from the content includes, during a content extraction phase in which the content is extracted from the content source, generating (i) first word variants for a first parsed word of the content, (ii) second word variants for a second parsed word of the content, and so on.

In some arrangements, generating the multiple variants from the content further includes generating, following the content extraction phase and during a classification phase in which the content is classified to a vocabulary, (i) additional first word variants from the first word variants for the first parsed word of the content, (ii) additional second word variants from the second word variants for the second parsed word of the content, and so on.

In some arrangements, a content extraction phase involves extracting the content from the content source. In these arrangements, generating the multiple variants from the content includes generating, following the content extraction phase and during a classification phase in which the content is classified to a vocabulary, (i) first word variants for a first parsed word of the content and (ii) second word variants for a second parsed word of the content.

In some arrangements, performing the evaluation operations includes performing matching operations which compare each variant to a database of sensitive data or sensitive data patterns to determine whether that variant includes sensitive data. The transformational database enables convenient variant generation (i.e., creation of multiple permutations).

In some arrangements, performing the evaluation operations further includes providing, based on results of the matching operations, each variant with a numerical risk score indicating a likelihood that the variant includes sensitive data.

In some arrangements, the control operation includes comparing the numerical risk score which is provided to each variant to a predefined threshold score and, if the numerical risk score which is provided to that variant is higher than the predefined threshold score, labeling a parsed word from which that variant was generated as including sensitive data.

In some arrangements, the content source is a file. Here, performing the control operation may further include releasing the file to the destination when all numerical risk scores provided to all of the variants do not exceed the predefined threshold score, and preventing release of the file to the destination when at least one numerical risk score provided to a variant exceeds the predefined threshold score. Alternatively, performing the control operation may further include releasing the file to the destination when all numerical risk scores provided to all of the variants do not exceed the predefined threshold score and providing, in place of the file, a redacted file to the destination when at least one numerical risk score provided to a variant exceeds the predefined threshold score.

In some arrangements, the content source is an audio feed. In these arrangements, generating multiple variants from the content includes generating, during a content extraction phase in which the audio feed is voice recognized, (i) first word variants for a first parsed word of the audio feed, (ii) second word variants for a second parsed word of the audio feed, and so on.

In some arrangements, the content source is an image scan. In these arrangements, generating multiple variants from the content includes generating, during a content extraction phase in which the image scan is recognized using optical character recognition (OCR), (i) first word variants for a first parsed word of the image scan, (ii) second word variants for a second parsed word of the image scan, and so on.

In some arrangements, the content source is a chemical formula in graphical representation. In these arrangements, generating multiple variants from the content includes generating, during a content extraction phase in which the chemical formula in graphical representation is converted into a text representation, (i) first word variants for a first parsed word of the chemical formula, (ii) second word variants for a second parsed word of the chemical formula, and so on.

It should be understood that, in the cloud context, the processing circuitry can be formed by remote computer resources distributed over a network. Such a computing environment is capable of providing certain advantages such as multiprocessing, enhanced fault tolerance, load balancing, processing flexibility, etc.

Other embodiments are directed to electronic systems and apparatus, processing circuits, computer program products, and so on. Some embodiments are directed to various methods, electronic components and circuitry which are involved in performing similarity-based DLP.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to performing similarity-based data loss prevention (DLP) which involves generating multiple variants (i.e., similar permutations) from content (e.g., where several variants are generated for a single parsed word) and only releasing the content when there are no variants that register as sensitive data. If there is at least one variant that registers as sensitive data, the content may include sensitive data or a malicious person may have slightly modified the sensitive data in an attempt to defeat DLP. In some arrangements, the variants for each parsed word (e.g., each text string) are assigned numerical risk scores and that parsed word is labeled as including sensitive data when any of the numerical risk scores exceeds a predefined threshold score. Such similarity-based DLP enables straight forward detection of sensitive data within content as well as allows for convenient tuning and machine learning for a DLP system.

Figure 1:
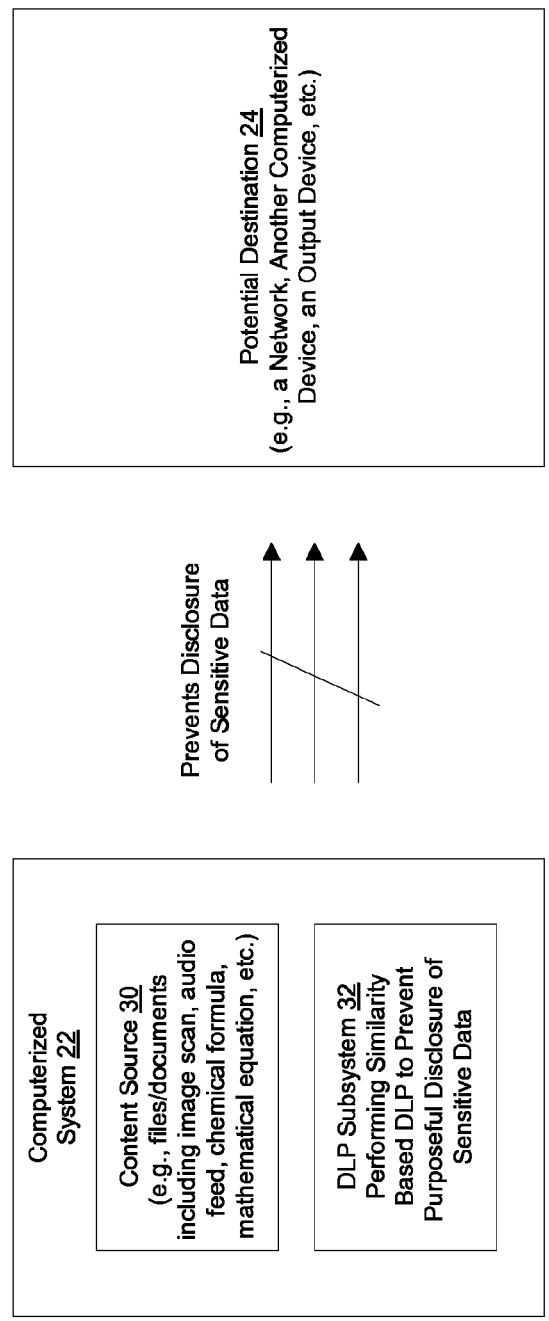
FIG. 1 is a block diagram of an electronic environment which is suitable for similarity-based data loss prevention.

FIG. 1 shows an electronic environment 20 which is suitable for similarity-based DLP. The electronic environment 20 includes a computerized system 22 which enjoys similarity-based DLP protection, and a potential destination 24 for contenting containing sensitive data.

The computerized system 22 may take the form of any smart equipment such as a general purpose computer, server hardware, a client device, a multiprocessing environment, a computerized platform configured to provide a virtual environment, a laptop, a smart phone, and so on. As shown in FIG. 1, the computerized system 22 includes a content source 30, and a DLP subsystem 32.

The potential destination 24 may take the form of any device(s) or location(s) capable of receiving information from the computerized system 22. Accordingly, the potential destination 24 may take the form of any external communications medium, another computerized system/device, an output peripheral (e.g., an external storage location, a memory stick, a display, etc.), and so on.

It should be understood that the content source 30 may include potentially sensitive data which should not be allowed to escape to the potential destination 24. Examples of possible content sources 30 include documents or other types of files containing sensitive text, image scans or bitmaps, audio feeds, and files containing chemical formulae and/or mathematical equations, among others.

Before the computerized system 22 outputs any content from the content source 30, the DLP subsystem 32 processes that content using similarity-based DLP. In particular, the DLP subsystem 32 generates multiple variants from the content and only releases the content when there are no variants that register as sensitive data. Such operation protects against a malicious person slightly modifying the sensitive data in an attempt to defeat the DLP subsystem 32.

It should be understood that, in some arrangements, the DLP subsystem 32 resides in the I/O stack of the computerized system 22 and processes all data (e.g., emails, documents, other types of files, etc.) before that data is allowed to exit the computerized system 22. In other arrangements, the DLP subsystem 32 is a tool which is invoked to process data which is temporarily cached before or after the I/O stack, and so on. Further details will now be provided with reference to FIG. 2.

Figure 2:
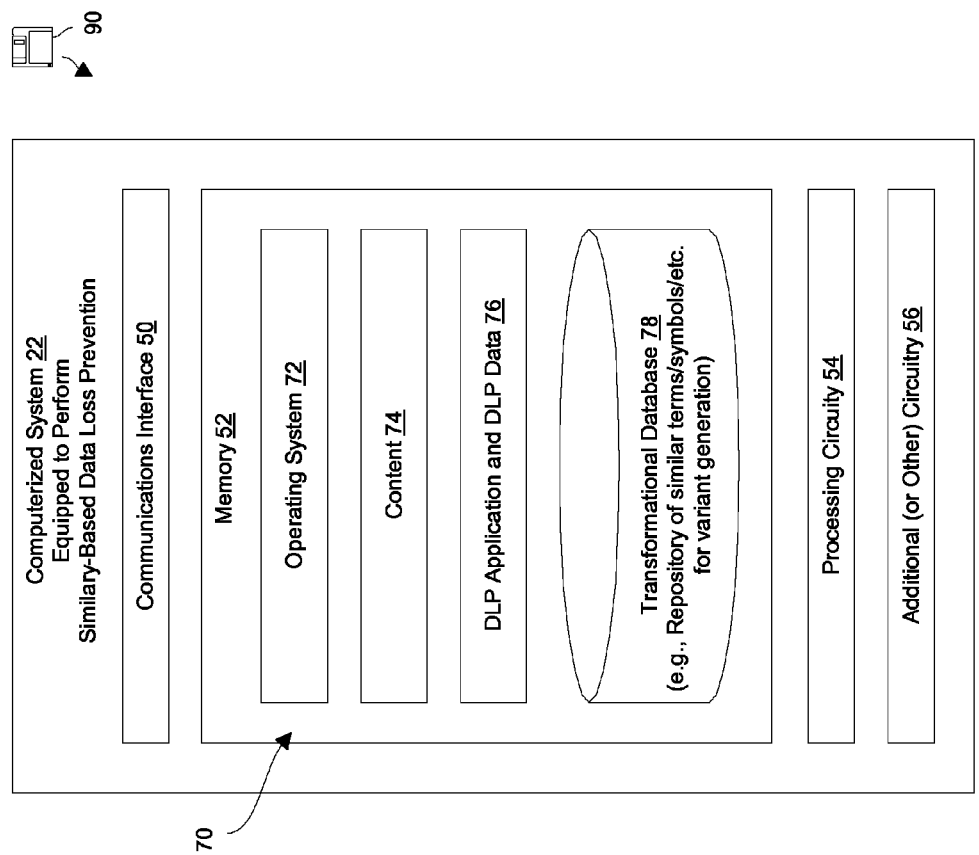
FIG. 2 is a block diagram of a computerized system of the electronic environment of FIG. 1.

FIG. 2 shows particular details of the computerized system 22. The computerized system 22 includes a communications interface 50, memory 52, processing circuitry 54, and additional (or other) circuitry 56.

The communications interface 50 is constructed and arranged to connect the computerized system 22 to external components (e.g., see the potential destination 24 in FIG. 1). Such communications may be fiber optic based, copper-based, wireless, combinations thereof, and so on.

The memory 52 is intended to represent both volatile storage (e.g., DRAM, SRAM, etc.) and non-volatile storage (e.g., internal disk drives and internal flash memory, etc.). The memory 52 stores a variety of software constructs 70 including an operating system 72 to manage resources of the computer system 22, content 74 which may contain sensitive data (also see the content source 30 in FIG. 1), a DLP application and DLP data 76, and a transformational database 68 (e.g., mappings of letters, numbers, symbols, and other characters for variant generation).

The processing circuitry 54 is constructed and arranged to operate in accordance with the various software constructs 70 stored in the memory 52. Such circuitry 54 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software constructs 70 to the computerized system 22. The computer program product 90 has a non-transitory (or non-volatile) computer readable medium which stores a set of instructions which controls one or more operations of the computerized system 22. Examples of suitable computer readable storage media include tangible articles of manufacture and apparatus which store instructions in a non-volatile manner such as CD-ROM, flash memory, disk memory, tape memory, and the like.

The additional (or other) circuitry 56 represents other portions of the computerized system 22. For example, the computerized system 22 may include a user interface to enable a user such as an administrator to enter input and receive output (user I/O) to operate the computerized system 22.

During operation, the processing circuitry 64 accesses the DLP application and DLP data 76 to form specialized control circuitry to perform various DLP operations (also see the DLP subsystem 32 in FIG. 1). For example, when the processing circuitry 64 runs the DLP application, the specialized control circuitry performs similarity-based DLP to prevent sensitive data from escaping to a potential destination 24 (FIG. 1). Further details of this operation will now be provided with reference to FIG. 3.

Figure 3:
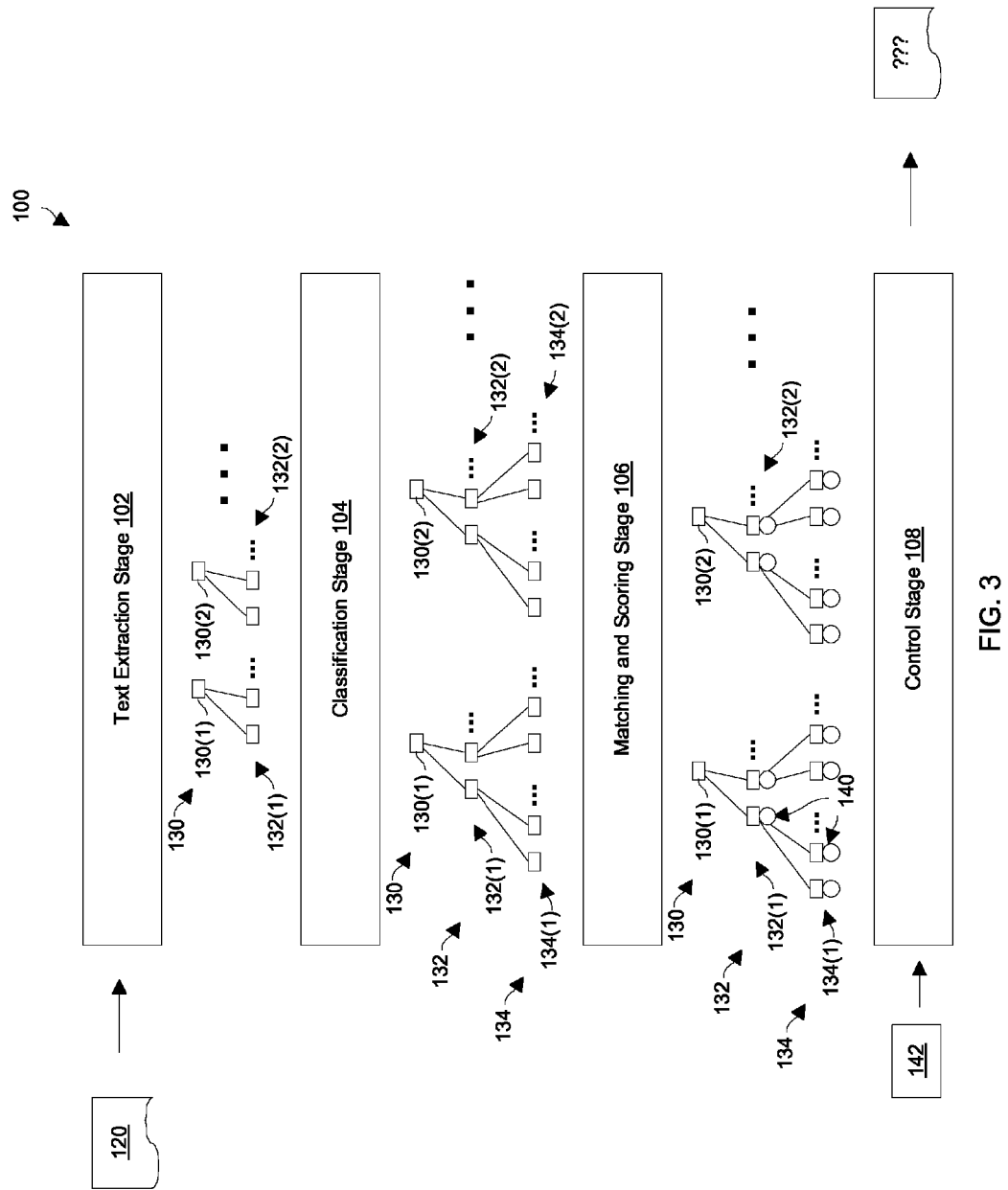
FIG. 3 is a block diagram of particular details of a data loss prevention (DLP) subsystem of the computerized system of FIG. 2.

FIG. 3 is a block diagram illustrating particular operating stages 100 of the DLP subsystem 32 which performs DLP on content from the content source 30 (also see FIG. 1). In particular, the DLP subsystem 32 includes a text (or content) extraction stage 102, a classification stage 104, a matching and scoring stage 106, and a control stage 108 which are arranged in a serial or pipelined order.

The text extraction stage 102 receives, as input, initial content 120 from the content source 30. Examples of suitable content include documents containing text, images or bitmaps, files containing chemical formulae and/or mathematical equations, audio input, and so on. As the text extraction stage 102 receives the initial content 120, the text extraction stage 102 converts the initial content 120 into plain text, i.e., a series of basic parsed words or terms. For instance, if the initial content 120 is in the form of text file, extraction may simply involve the content extraction stage 102 reading plain text from the text file. However, if the initial content 120 is a file in some other form, the text extraction stage 102 may need to remove metadata, perform recognition operations (e.g., OCR, speech-to-text recognition, etc.), and so on to properly extract plain text from the initial content 120.

During this extraction process, the text extraction stage 102 does not simply output a series of words as may be outputted by conventional DLP systems. Rather, the text extraction stage 102 attempts to generate variants (or permutations) of each parsed word (or text string) 130. To this end, the text extraction stage 102 accesses the transformational database 78 (FIG. 2) which stores mappings of similar characters, symbols, etc. Based on the stored mappings, the text extraction stage 102 transforms, if possible, each parsed word 130 into similar word variants 132. That is, the text extraction stage 102 tries to generate, for a first parsed word 130(1) of the text, multiple word variants 132(1). Additionally, the text extraction stage 102 tries to generate, for a second parsed word 130(2) of the text, multiple word variants 132(2), and so on.

For example, the transformational database 78 may store a set of entries mapping the number zero (0) to a variety of other common characters and symbols. Such characters and symbols may include the letter "D", the letter "O", the letter "Q", etc. since such glyphs appear similar to the number zero (0).

As another example, the transformational database 78 may store another set of entries mapping the number one (1) to a variety of common characters and symbols. Such characters and symbols may include the letter "L", an exclamation point "!", an open bracket "[", a close brack "]", a backslash "/", etc. since such glyphs appear similar to the number zero (1), and so on.

One will appreciate that such transformations are essentially the opposite of a Unicode case folding function fc( ) which converts uncommon strings into normalized strings to equate uncommon spellings to a plain text word. In contrast, the text extraction stage 102 uses the transformational database 78 to transform a parsed word into multiple variants of that parsed word.

Next, the classification stage 104 classifies the parsed words 130 to a particular vocabulary. In a conventional DLP system, a classification operation may be intended to narrow odd or poorly recognized words into a correct word to improve accuracy. However, the classification stage 104 of the DLP subsystem 32 attempts to generate even more variants 134 from the variants 132 outputted from the text extraction stage 102. Such operation may cross into other vocabularies, fonts, editing tools, etc. For example, the further variants can be generated from entries of the transformational database 78 which map certain characters to other symbols, other letters or numbers, special characters, etc. (i.e., glyphs) of other classes.

Next, the matching and scoring stage 106 performs comparison operations to determine whether the initial content 120 included sensitive data. To this end, the matching and scoring stage 106 evaluates each variant 132 from the text extraction stage 102 and each variant 134 from the classification stage 104 to determine the likelihood of that variant 132, 134 representing sensitive data. Along these lines, the DLP subsystem 32 performs exact and fuzzy matching looking for particular items of sensitive data (e.g., looking for an exact phone number, or exact sensitive words, etc.) as well as particular data patterns (e.g., numbers in a credit card format, alphanumeric strings in a medical record format, etc.).

For each variant 132, the matching and scoring stage 106 assigns a respective numerical risk score 140 identifying a level of riskiness. That is, the numerical risk score 140 assigned to each variant 132, 134 indicates a measure of whether that variant 132, 134 is considered to include sensitive data.

Next, the control stage 108 applies a set of policies which determines whether the initial content 120 is permitted to pass through the DLP subsystem 32 or whether the DLP subsystem 32 blocks some or all of the initial content 120. In particular, the control stage 108 compares the numerical risk scores 140 assigned to the variants 132, 134 to a predefined threshold score 142. If the numerical risk scores 140 for all of the variants 132, 134 for a particular parsed word 130 are lower than the predefined threshold score 142, the particular parsed word 130 is considered not to contain sensitive data. In such a situation, the control stage 1008 allows the initial content 120 to be released, i.e., the initial content 120 is allowed to reach the destination 24 (also see FIG. 1).

However, if the numerical risk score 140 for any of the similar variants 132, 134 for a particular parsed word 130 is higher than the predefined threshold score 142, the particular parsed word 130 is considered to contain sensitive data and labeled as such. In this situation, the control stage 108 may block just that particular parsed word 130 only (e.g., the word 130 is redacted or replaced with meaningless characters such as "###", etc.) and allow other parsed words 130 which are not considered to contain sensitive data to reach the destination 24. Alternatively, the control stage 108 blocks everything so that none of the initial content 120 reaches the destination 24. Such operation can be based on policy, the level of sensitivity of the data, other factors, etc.

It should be understood that, in some arrangements, the processing circuitry 54 (FIG. 2) may be distributed across multiple processors (e.g., physical processors, virtual processors, etc.) in order to distribute the workload. Such organization spreads the work of creating the variants, scoring the variants and evaluating the variants to locations where processing cycles are available for load balancing purposes.

Additionally, modifications to such processing may be made over time. For example, the predefined threshold may be adjusted depending on how conservative the DLP subsystem 32 should be in safeguarding sensitive data. Furthermore, parameters within the DLP subsystem 32 can be adjusted (e.g., machine learning) to improve performance over time. Further details will now be provided with reference to FIG. 4.

Suppose that a publicity agent for celebrities stores a sensitive phone number "888-555-3232" for a particular celebrity on an enterprise server of the agent's office. Perhaps that sensitive phone number belongs to the agent's star celebrity, and the agent is not permitted to disclose that phone number to the public. Further suppose that a malicious employ at the agent's office tries to send out an email message containing that sensitive phone number by purposefully camouflaging the sensitive phone number as "BBB_SSS_EZEZ".

Figure 4:
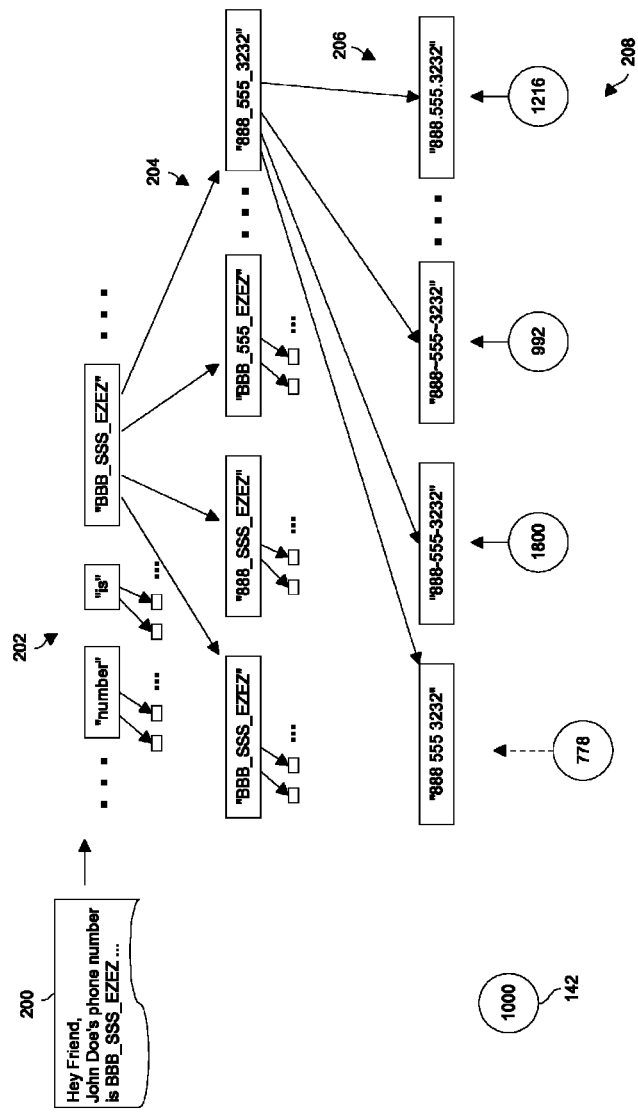
FIG. 4 is an example illustrating certain aspects of the DLP subsystem of the computerized system of FIG. 2.

FIG. 4 shows that the text extraction stage 102 (FIG. 3) extracts, from an original email message 200, a series of parsed words 202 which includes "BBB_SSS_EZEZ" in basic form. The text extraction stage 102 then outputs a set of similar variants for each parsed word including a particular set of similar variants 204 for "BBB_SSS_EZEZ". For example, the transformational database 78 (FIG. 2) may store an entry which maps the letter "B" to other characters such as the number eight (8), another entry which maps the letter "S" to other characters such as the number five (5), and so on.

Next, the classification stage 104 (FIG. 3) generates new similar variants for each variant provided by the text extraction stage 102. Among the new similar variants generated by the classification stage 104 is a set of variants 206 for "888_555_3232". For example, the transformational database 78 (FIG. 2) may store a symbol vocabulary, and entries which maps the underscore symbol "_" to other characters such as a blank space " ", a dash "-", a tilde "~", a period ".", and so on.

Then, the matching and scoring stage 106 (FIG. 3) attempts to match the generated variants 204, 206 to determine whether any of the variants 204, 106 contain sensitive data. Such matching may involve exact matching (e.g., looking for the specific phone number "888-555-3232") and pattern matching (e.g., looking for particular patterns of characters). Additionally, the matching and scoring stage 106 assigns numerical risk scores 208 to each variant 204, 206 to indicate a measure of probability (i.e., likelihood) that the corresponding variant 204, 206 contains sensitive data.

Next, the control stage 108 (FIG. 3) determines whether any of the variants 204, 206 contains sensitive data. In particular, the control stage 108 compares the assigned numerical risk scores 208 to a predefined threshold score 142 (FIG. 3). By way of example only, the similar variants "888 555 3232" and "888~555~3232" are considered not to contain sensitive data because their assigned numerical risk scores of "778" and "992" are below the predefined threshold score 142 of "1000". However, the similar variants "888-555-3232" and "888.555.3232" are considered to contain sensitive data because their assigned numerical risk scores are above the predefined threshold score 142 of "1000".

Since there is at least one variant 204, 206 that is considered to contain sensitive data, the original parsed word "BBB_SSS_EZEZ" of the email message 200 is considered to contain sensitive data as well and is labeled as such. As a result, the control stage 108 blocks "BBB_SSS_EZEZ" from being released. In particular, based on policy, the control stage 108 may block the entire email message 200. Alternatively, the control stage 108 may simply redact or replace the parsed word containing the sensitive data and allow the remaining parsed words which do not contain sensitive data to reach the destination 24 (e.g., " . . . phone number is ############").

As another example, suppose that a malicious person has edited a document by replacing the name "The ORION Project" with "Th3 ORION Pr0j3ct". The DLP subsystem 32 may extract "Th3 0R10N Pr0j3ct" from the document and generate several similar variants including "The ORION Project" as a variant. Using risk score assignments (or even precise matching to a blacklist), the DLP subsystem 32 can discover the camouflaged name and then prevent data loss (e.g., block the entire document from leaving the computerized system 22, also see FIG. 1).

Furthermore, in some arrangements, the DLP subsystem 32 outputs an alert (or alarm) to signal that an attempt was made to disclose sensitive data. For example, a security person or administrator can be informed immediately that an attempt was made. The alert may include information such as who made the attempt, a time and date, the attempted destination, and so on. Further details will now be provided with reference to FIG. 5.

Figure 5:
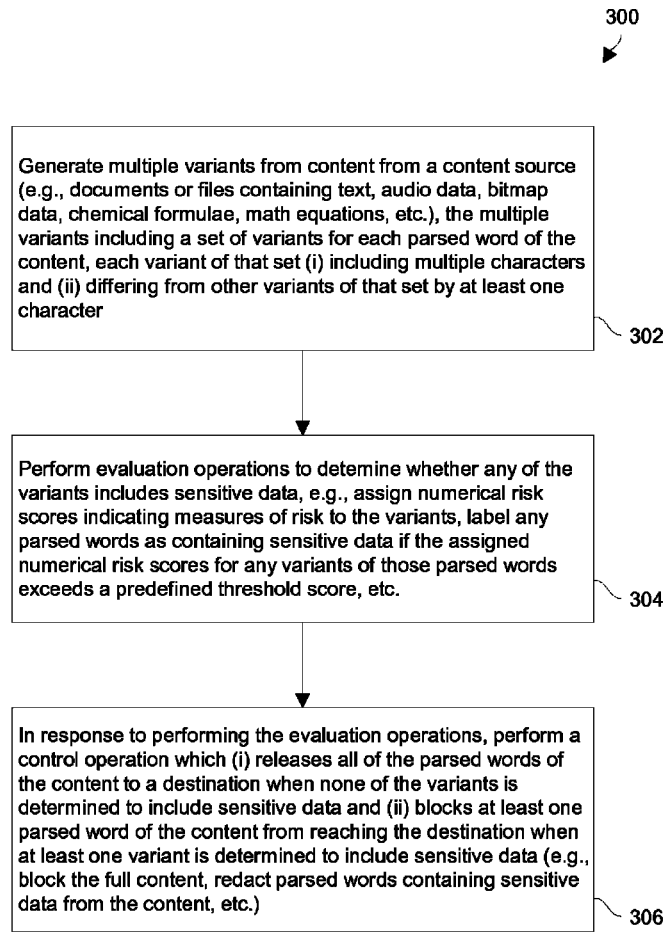
FIG. 5 is a flowchart of a procedure which is performed by the computerized system of FIG. 2.

FIG. 5 is a flowchart of a procedure 300 which is performed by the computerized system 22 (also see FIGS. 1 and 2). The procedure 300 performs similarity-based DLP on content from a content source 30.

At 302, the computerized system 22 generates multiple variants from the content. The multiple variants include a set of variants for each parsed word of the content, each variant of that set (i) including multiple characters and (ii) differing from other variants of that set by at least one character. In particular, the computerized system 22 generates the variants using a transformational database 78 which stores mappings of characters (i.e., letters, numbers, symbols, terms, etc.) to other similar characters. Accordingly, even if the computerized system 22 did not determine that an original parsed word contains sensitive data, the computerized system 22 is able to determine that a similar variant of that original parsed word contains sensitive data. As a result, if a malicious person attempts to circumvent DLP by hiding certain sensitive data, the computerized system 22 is able to generate a similar variant that the computerized system 22 identifies as containing the sensitive data.

At 304, the computerized system 22 performs evaluation operations to determine whether any of the variants includes sensitive data. In particular, the computerize system 22 assigns numerical risk scores to each variant based on matching and scoring operations (e.g., risk-based analysis). Each numerical risk score is a measure of the likelihood that a variant to which it is assigned contains sensitive data.

At 306, the computerized system 22 performs, in response to the evaluation operations, a control operation which (i) releases all of the parsed words of the content to a destination when none of the variants is determined to include sensitive data, and (ii) blocks at least one parsed word of the content from reaching the destination when at least one variant is determined to include sensitive data. In particular, the computerized system 22 compares the assigned numerical risk scores to a predefined threshold score. Any numerical risk scores that are higher than the predefined threshold score indicate the existence of sensitive data within the original content. On the other hand, if none of the numerical risk scores are higher than the predefined threshold score, the original content is considered not to contain sensitive data.

As described above, improved techniques are directed to performing DLP by generating multiple variants (i.e., similar permutations) from content (e.g., where several variants are generated for a single parsed word) and only releasing the content when there are no variants that are labeled as containing sensitive data. If there is at least one variant that is labeled as containing sensitive data, the content may include actual sensitive data or a malicious person may have slightly modified the sensitive data in an attempt to defeat DLP. In some arrangements, the variants for each parsed word are assigned numerical risk scores and that parsed word is considered to include sensitive data when any of the numerical risk scores exceeds a predefined threshold score. Such similarity-based DLP enables straight forward detection of sensitive data within content as well as convenient tuning and machine learning for a DLP system.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that the computerized system 22 assigns numerical risk scores to each parsed word and then compares the assigned numerical risk scores to a predefined threshold score. Other evaluation processes are suitable for use as well. For example, for each parsed word, the numerical risk scores assigned to its variants can be aggregated (i.e., combined) and normalized to provide overall risk scores for each parsed word. Then, the parsed word is considered to contain sensitive data if any overall risk scores exceed a predefined threshold score. Such modifications and enhancements are intended to belong to various embodiments of the disclosure.

What is claimed is:

1. A method of performing data loss prevention on content from a content source, the method comprising:
   generating, by processing circuitry, multiple variants from the content, the multiple variants including a set of variants for each parsed word of the content, each variant of the set (i) including multiple characters and (ii) differing from other variants of the set by at least one character;
   performing, by the processing circuitry, evaluation operations to determine whether any of the variants includes sensitive data; and
   in response to the evaluation operations, performing, by the processing circuitry, a control operation which (i) releases all of the parsed words of the content to a destination when none of the variants is determined to include sensitive data, and (ii) blocks at least one parsed word of the content from reaching the destination when at least one variant is determined to include sensitive data;
   wherein generating the multiple variants from the content includes:
   applying a set of predefined transformations from a transformation database to the content from the content source to form the multiple variants.

2. A method as in claim 1 wherein applying the set of predefined transformations from the transformation database to the content from the content source includes:
   during a content extraction phase in which the content is extracted from the content source, generating (i) first word variants for a first parsed word of the content and (ii) second word variants for a second parsed word of the content.

3. A method as in claim 2 wherein applying the set of predefined transformations from the transformation database to the content from the content source further includes:
   following the content extraction phase and during a classification phase in which the content is classified to a vocabulary, generating (i) additional first word variants from the first word variants for the first parsed word of the content and (ii) additional second word variants from the second word variants for the second parsed word of the content.

4. A method as in claim 1 wherein a content extraction phase involves extracting the content from the content source; and wherein applying the set of predefined transformations from the transformation database to the content from the content source includes:
  following the content extraction phase and during a classification phase in which the content is classified to a vocabulary, generating (i) first word variants for a first parsed word of the content and (ii) second word variants for a second parsed word of the content.

5. A method as in claim 1 wherein performing the evaluation operations includes:
  performing matching operations which compare each variant to a database of sensitive data and sensitive data patterns to determine whether that variant includes sensitive data.

6. A method as in claim 5 wherein performing the evaluation operations further includes:
  based on results of the matching operations, providing each variant with a numerical risk score indicating a likelihood that the variant includes sensitive data.

7. A method as in claim 6 wherein performing the control operation includes:
  comparing the numerical risk score which is provided to each variant to a predefined threshold score and, if the numerical risk score which is provided to that variant is higher than the predefined threshold score, labeling a parsed word from which that variant was generated as including sensitive data.

8. A method as in claim 6 wherein the content source is a file; and wherein performing the control operation further includes:
  releasing the file to the destination when all numerical risk scores provided to all of the variants do not exceed the predefined threshold score, and
  preventing release of the file to the destination when at least one numerical risk score provided to a variant exceeds the predefined threshold score.

9. A method as in claim 6 wherein the content source is a file; and wherein performing the control operation further includes:
  releasing the file to the destination when all numerical risk scores provided to all of the variants do not exceed the predefined threshold score, and
  providing, in place of the file, a redacted file to the destination when at least one numerical risk score provided to a variant exceeds the predefined threshold score.

10. A method as in claim 1 wherein the content source is an audio feed; and wherein generating multiple variants from the content further includes:
  during a content extraction phase in which the audio feed is voice recognized, generating (i) first word variants for a first parsed word of the audio feed and (ii) second word variants for a second parsed word of the audio feed.

11. A method as in claim 1 wherein the content source is an image scan; and wherein generating multiple variants from the content further includes:
  during a content extraction phase in which the image scan is recognized using optical character recognition (OCR), generating (i) first word variants for a first parsed word of the image scan and (ii) second word variants for a second parsed word of the image scan.

12. A method as in claim 1 wherein the content source is a chemical formula in graphical representation; and wherein generating multiple variants from the content further includes:
  during a content extraction phase in which the chemical formula in graphical representation is converted into a text representation, generating (i) first word variants for a first parsed word of the chemical formula and (ii) second word variants for a second parsed word of the chemical formula.

13. A method as in claim 1 wherein applying the set of predefined transformations from the transformation database to the content from the content source includes:
  reading initial content from a content file,
  extracting, from the initial content read from the content file, a series of basic parsed content terms, and
  creating, as the multiple variants, variant terms from the series of basic parsed content terms.

14. A method as in claim 13 wherein performing the control operation includes:
  sending the content file to the destination in response to determining that the series of basic parsed content terms, which was extracted from the initial content read from the content file, does not include sensitive data.

15. A method as in claim 13 wherein performing the control operation includes:
  preventing transmission of the content file to the destination in response to determining that the series of basic parsed content terms, which was extracted from the initial content read from the content file, includes sensitive data.

16. A method as in claim 1 wherein performing the evaluation operations includes:
  performing matching operations which compare both (i) the content from the content source as well as (ii) each variant formed from the content to a database of sensitive data and sensitive data patterns to determine whether any of the content and variants includes sensitive data.

17. An electronic apparatus, comprising:
  a communications interface which is constructed and arranged to communicate with an external device;
  memory; and
  control circuitry coupled to the communications interface and the memory, the memory storing instructions which, when carried out by the control circuitry, cause the control circuitry to:
    generate multiple variants from content from a content source, the multiple variants including a set of variants for each parsed word of the content, each variant of the set (i) including multiple characters and (ii) differing from other variants of the set by at least one character,
    perform evaluation operations to determine whether any of the variants includes sensitive data, and
    in response to the evaluation operations, perform a control operation which (i) releases all of the parsed words of the content to the external device when none of the variants is determined to include sensitive data, and (ii) blocks at least one parsed word of the content from reaching the external device when at least one variant is determined to include sensitive data;
  wherein the control circuitry, when generating the multiple variants from the content, is constructed and arranged to:
    apply a set of predefined transformations from a transformation database to the content from the content source to form the multiple variants.

18. An electronic apparatus as in claim 17 wherein the control circuitry, when applying the set of predefined transformations from the transformation database to the content from the content source, is constructed and arranged to:

generate, during a content extraction phase in which the content is extracted from the content source, (i) first word variants for a first parsed word of the content and (ii) second word variants for a second parsed word of the content.

19. An electronic apparatus as in claim 18 wherein the control circuitry, when applying the set of predefined transformations from the transformation database to the content from the content source, is further constructed and arranged to:

following the content extraction phase and during a classification phase in which the content is classified to a vocabulary, generate (i) additional first word variants from the first word variants for the first parsed word of the content and (ii) additional second word variants from the second word variants for the second parsed word of the content.

20. An electronic apparatus in claim 17 wherein the control circuitry, when performing the evaluation operations, is constructed and arranged to:

perform matching operations which compare each variant to characters of a transformational database to determine whether that variant includes sensitive data.

21. A computer program product having a non-transitory computer readable medium which stores a set of instructions to perform data loss prevention on content from a content source, the set of instructions, when carried out by computerized circuitry, causing the computerized circuitry to perform a method of:

generating multiple variants from the content, the multiple variants including a set of variants for each parsed word of the content, each variant of the set (i) including multiple characters and (ii) differing from other variants of the set by at least one character;

performing evaluation operations to determine whether any of the variants includes sensitive data; and in response to the evaluation operations, performing a control operation which (i) releases all of the parsed words of the content to a destination when none of the variants is determined to include sensitive data, and (ii) blocks at least one parsed word of the content from reaching the destination when at least one variant is determined to include sensitive data;

wherein generating the multiple variants from the content includes:

applying a set of predefined transformations from a transformation database to the content from the content source to form the multiple variants.

22. A computer program product as in claim 21 wherein applying the set of predefined transformations from the transformation database to the content from the content source includes:

during a content extraction phase in which the content is extracted from the content source, generating (i) first word variants for a first parsed word of the content and (ii) second word variants for a second parsed word of the content.

23. A computer program product as in claim 22 wherein applying the set of predefined transformations from the transformation database to the content from the content source further includes:

following the content extraction phase and during a classification phase in which the content is classified to a vocabulary, generating (i) additional first word variants from the first word variants for the first parsed word of the content and (ii) additional second word variants from the second word variants for the second parsed word of the content.

24. A computer program product as in claim 21 wherein performing the evaluation operations includes:

performing matching operations which compare each variant to characters of a transformational database to determine whether that variant includes sensitive data.

* * * * *